(12) United States Patent
Krempa et al.

(10) Patent No.: US 11,073,211 B2
(45) Date of Patent: Jul. 27, 2021

(54) HIGH PRESSURE ANTI-EXTRUSION DIAPHRAGM

(71) Applicant: Garlock Sealing Technologies, LLC, Palmyra, NY (US)

(72) Inventors: Matt Krempa, Palmyra, NY (US); Dan Naugle, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 101 days.

(21) Appl. No.: 16/273,866

(22) Filed: Feb. 12, 2019

(65) Prior Publication Data
US 2019/0249776 A1    Aug. 15, 2019

Related U.S. Application Data

(60) Provisional application No. 62/629,990, filed on Feb. 13, 2018.

(51) Int. Cl.
*F16J 15/12*    (2006.01)
*F16J 15/02*    (2006.01)
*F16J 3/02*    (2006.01)

(52) U.S. Cl.
CPC .............. *F16J 15/123* (2013.01); *F16J 3/02* (2013.01); *F16J 15/022* (2013.01); *F16J 15/028* (2013.01)

(58) Field of Classification Search
CPC .... F16J 15/00; F16J 15/12; F16J 15/121–123; F16J 15/02; F16J 15/022; F16J 15/162; F16J 15/40; F16J 15/46; F16J 15/48; F16J 15/021; F16J 15/08; F16J 15/028; F16J 3/00; F16J 3/02
USPC ........................................................ 277/600
See application file for complete search history.

(56) References Cited

U.S. PATENT DOCUMENTS

| | | | | | |
|---|---|---|---|---|---|
| 2,659,617 | A | * | 11/1953 | Cobb ................... | F16C 33/7843 277/376 |
| 4,953,583 | A | * | 9/1990 | Szlaga ............. | B60K 15/03519 137/118.02 |
| 5,065,782 | A | * | 11/1991 | Szlaga ............. | B60K 15/03519 137/110 |
| 5,518,018 | A | * | 5/1996 | Roetker ........... | B60K 15/03519 137/43 |

* cited by examiner

*Primary Examiner* — Nathan Cumar
(74) *Attorney, Agent, or Firm* — Perkins Coie LLP

(57) ABSTRACT

A diaphragm seal with a unique profile at its outer diameter and a high-pressure seal used to at least partially envelope the outer diameter of the diaphragm seal is described. The high-pressure seal may envelope an outer diameter side of the diaphragm seal such that the high-pressure seal creates a barrier between the diaphragm seal and the interface between an upper pump housing portion and a lower pump housing portion in which the diaphragm seal can be installed. The high-pressure seal may provide a "gripping" force on the diaphragm seal so as to inhibit or prevent extrusion of the diaphragm seal in either a radially inner or radially outer direction when installed in a pump housing.

20 Claims, 11 Drawing Sheets

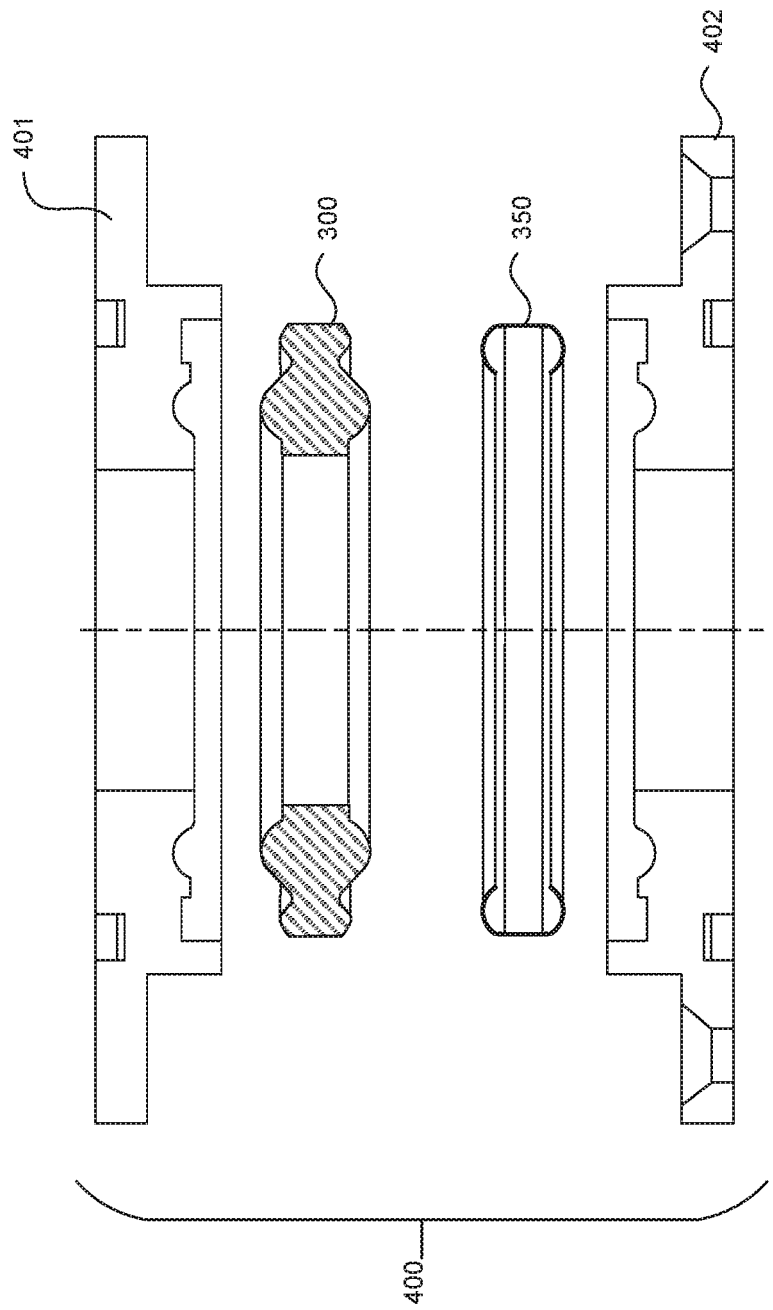

HIGH PRESSURE ANTI-EXTRUSION DIAPHRAGM

CROSS-REFERENCE TO RELATED APPLICATION(S)

The present application claims the benefit of priority under 35 U.S.C. § 119(e) to U.S. Provisional Patent Application No. 62/629,990, filed Feb. 12, 2018, the entirety of which is hereby incorporated by reference.

BACKGROUND

Diaphragms are used in many applications, including in pump housings to provide a flexible barrier/seal between an upper pump housing portion and a lower pump housing portion. Diaphragms generally have a disc shape, with its outer diameter secured between an upper and lower housing portion to provide a fluid-tight seal between the upper and lower housing portions and the interior portion of the diaphragm providing a flexible barrier. FIG. 1 illustrates a simplified cross-sectional view of a typical pump housing 10 with a diaphragm 20 installed therein. The pump housing 10 includes an upper housing portion 10a and a lower housing portion 10b. The diaphragm 20 is installed in the pump housing 10 by clamping the outer diameter of the diaphragm 20 between these two portions 10a, 10b. The central portion of the diaphragm 20 serves as a flexible barrier between the upper housing portion 10a and the lower housing portion 10b. Provided the upper housing portion 10a and lower housing portion 10b are sufficiently clamped down on the outer diameter of the diaphragm 20, the diaphragm also provides a fluid tight seal between the upper pump housing 10a and the lower pump housing 10b.

Due to the high pressure environments of pump housings and the flexible nature of the diaphragm, one issue that can be experienced with diaphragms installed in pump housings is excess extrusion of the diaphragm seal through, e.g., the interface between the upper pump housing portion and the lower pump housing portion.

In some previously known systems, the surfaces of the upper pump housing portion and/or the lower pump housing portion that contact the diaphragm seal are machined to include features that are designed to keep the diaphragm seal from extruding when high pressure loads are applied. However, this approach can fail when the extrusion force exceeds the surface friction of the upper pump housing portion and/or lower pump housing portion, or if the diaphragm seal itself physically fails due to excessive tension.

Accordingly, a need exists for an improved diaphragm seal design that can prevent diaphragm seal extrusion under high pressure loads.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a diaphragm seal with a unique profile at its outer diameter and a high-pressure seal used to at least partially envelope the outer diameter of the diaphragm seal installed in a pump housing are described. In some embodiments, the high-pressure seal envelopes an outer diameter side of the diaphragm seal such that the high-pressure seal creates a barrier between the diaphragm seal and the interface between the upper pump housing portion and the lower pump housing portion. The high-pressure seal can also provide a "gripping" force on the diaphragm seal so as to inhibit or prevent extrusion of the diaphragm seal in either a radially inner or radially outer direction.

These and other aspects of the diaphragm seal and high-pressure seal described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed diaphragm seal and high-pressure seal, including the preferred embodiment, are described with reference to the following figures, wherein like reference numerals refer to like parts through the various views unless otherwise specified.

FIG. 4 is a cross-sectional view illustrating the assembly of a diaphragm seal and a high-pressure seal according to various embodiments described herein in a pump housing.

DETAILED DESCRIPTION

Embodiments are described more fully below with reference to the accompanying Figures, which form a part hereof and show, way of illustration, specific exemplary embodiments. These embodiments are disclosed in sufficient detail to enable those of ordinary skill in the art to practice the invention. However, embodiments may be implemented in many different forms and should not be construed as being limited to the embodiments set forth herein. The following description is, therefore, not to be taken in a limiting sense.

Figure 1:
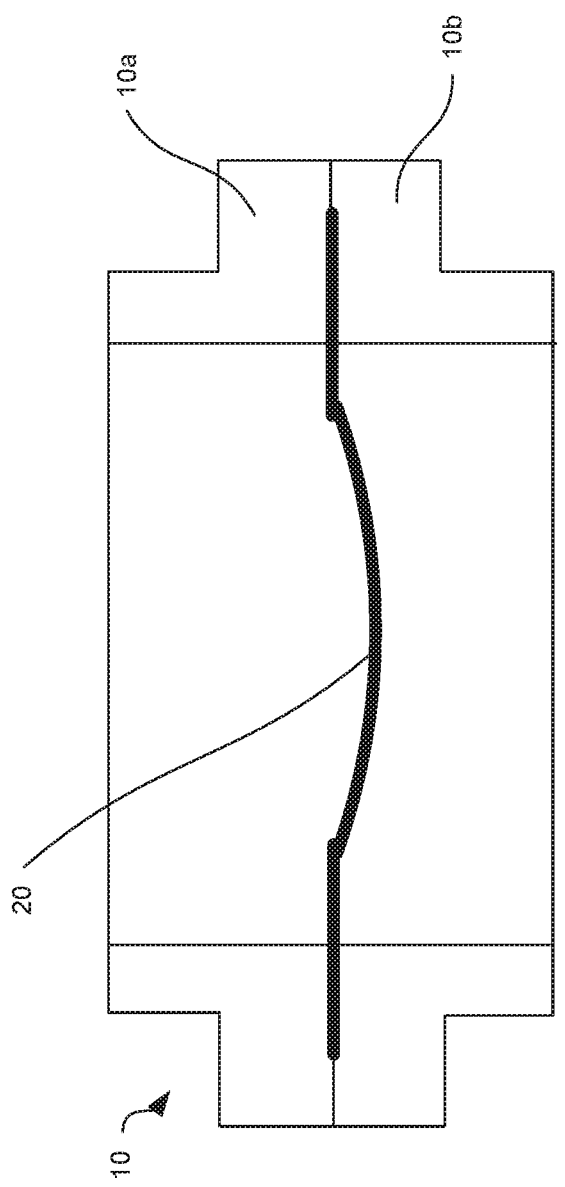
FIG. 1 is a simplified cross-sectional illustration of a pump housing having a diaphragm seal installed therein according to the prior art.
Figure 2A:
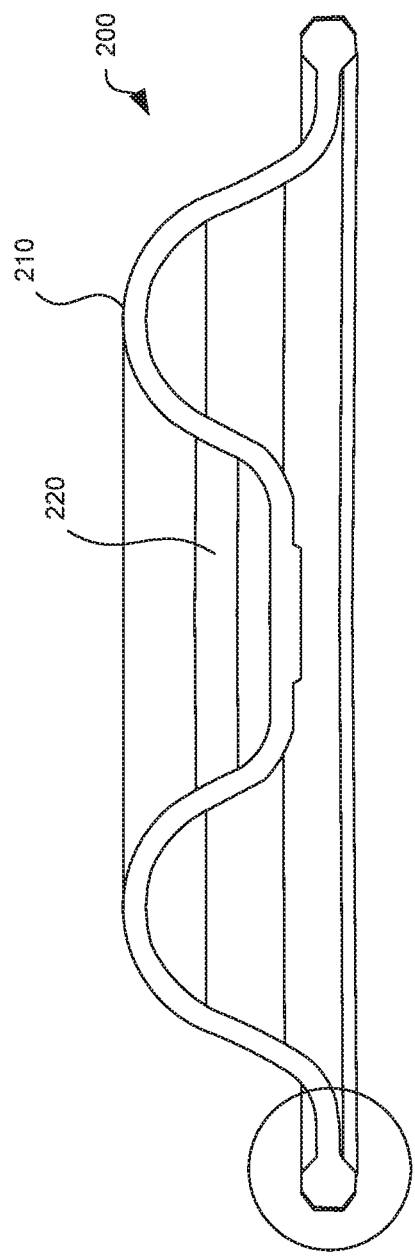
FIGS. 2A and 2B are cross-sectional views of a diaphragm seal according to some embodiments described herein.
Figure 2B:
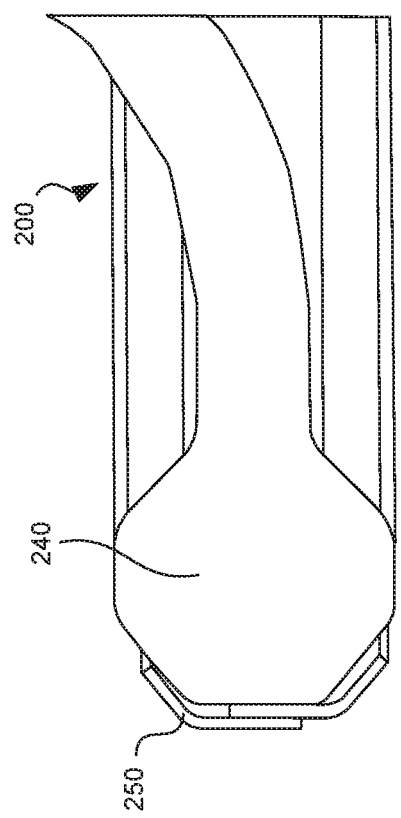

With reference to FIGS. 2A and 2B, an exemplary diaphragm seal 200 in accordance with various embodiments described herein is shown. The diaphragm 200 has a shape such that when it is installed in, for example, a passageway of a pump housing, the diaphragm 200 forms a barrier that can be a fluid tight seal by virtue of the manner in which it is clamped between an upper and lower housing portion of the pump housing (described in greater detail below). While FIG. 2A shows a diaphragm 200 having a raised annular portion 210 (defining a central depression 220), other diaphragm configurations are possible provided the diaphragm 200 has an overall disc-like shape that can form a barrier in a passageway. In some embodiments, the diaphragm 200 may have a central aperture through which a shaft (such as a reciprocating shaft) can be extended. In such embodiments, the shaft will be mated with the diaphragm 200 in a manner that ensures that a fluid tight seal is formed between the diaphragm 200 and the shaft.

FIG. 2B shows an expanded view of the outer diameter of the diaphragm 200. As discussed in greater detail below, the outer diameter generally includes a unique profile 240 such that when engaged with the upper and lower housing portions of the pump housing, the pump housing captures the diaphragm 200 and seals the outer diameter of the diaphragm 200 from media leakage. As also discussed in greater detail below, the outer diameter is at least partially enveloped by a high-pressure seal 250. This high-pressure seal also helps to prevent creep of the diaphragm seal in high pressure environments to thereby reduce or eliminate degradation of the diaphragm through cyclic pressure motion.

With reference to FIGS. 3A-3D, various diaphragm seal profiles suitable for use in the system described herein are shown. The different diaphragm seal profiles illustrated in FIGS. 3A-3D provide various beneficial features that can contribute to inhibiting or preventing diaphragm seal extrusion in a pump housing when the diaphragm seal is under pressure. For the sake of simplicity, the diaphragm seals shown in FIGS. 3A-3D, 4, and 5A-5C show only the outer diameter portion of the diaphragm seal. In other words, the interior portion of the diaphragm seal extending radially inward from the outer diameter portion is not shown, though in practice the diaphragm seals of FIGS. 3A-3D, 4 and 5A-5C will include this portion of the diaphragm seal.

Figure 3A:
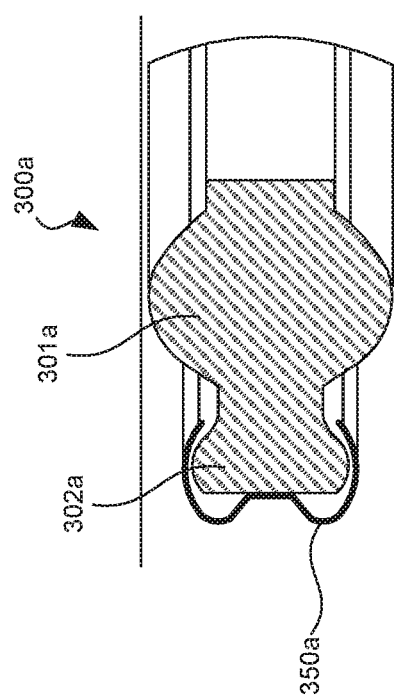
FIGS. 3A-3D are cross-sectional views of various diaphragm seal profiles and high-pressure seals suitable for use in embodiments described herein.

With references to FIG. 3A, a diaphragm seal 300a is shown wherein the profile of the diaphragm seal 300a at its outer diameter generally has two primary portions: a first round portion 301a located slightly inside the outer diameter of the diaphragm seal 300a and a second extension portion 302a at the outer diameter of the diaphragm seal 300a and generally extending from the first round portion 301a in a radially outward direction. The first round portion 301a can have a maximum thickness that is generally greater than the maximum thickness of the second extension portion 302a. Intermediate the first round portion 301a and the second extension portion 302a is a throat portion having a thickness less than both the first round portion 301a and the second extension portion 302a. In some embodiments, the second extension portion 302a can be considered as having a generally T-shape, with the T oriented on its side. In some embodiments, the thickness of the outer diameter end of the second extension portion 302a is greater than the throat portion of the of the second extension portion 302a but less than the maximum thickness of the first round portion 301a. Generally speaking, the internal portion of the diaphragm seal 300a (i.e., the portion of the seal extending radially inwardly from the first round portion 301a) will have a thickness less than the maximum thickness of first round portion 301a and the second extension portion 302a. The thickness of the internal portion of the diaphragm seal may be roughly equivalent to the thickness of the throat portion, or may be slightly thicker or slightly thinner than the throat portion.

Figure 3B:
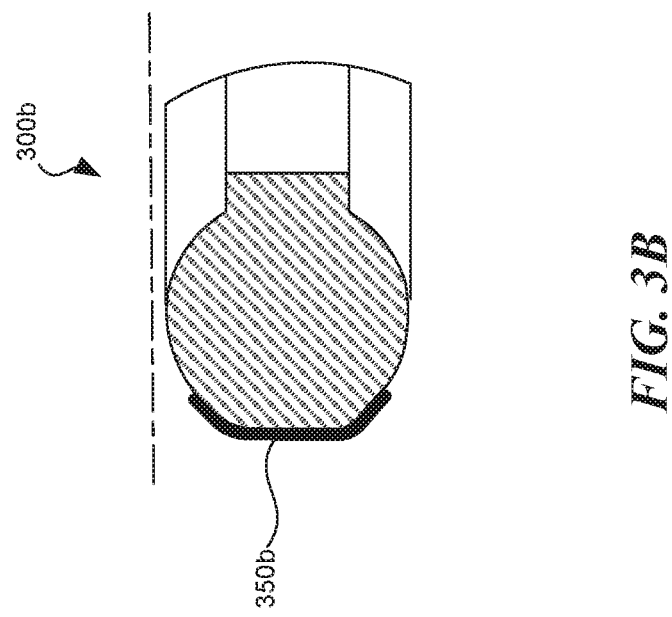

With reference to FIG. 3B, another diaphragm seal 300b suitable for use in the systems described herein is shown, wherein the profile of the diaphragm seal 300b at the outer diameter has a generally rounded shape.

Figure 3C:
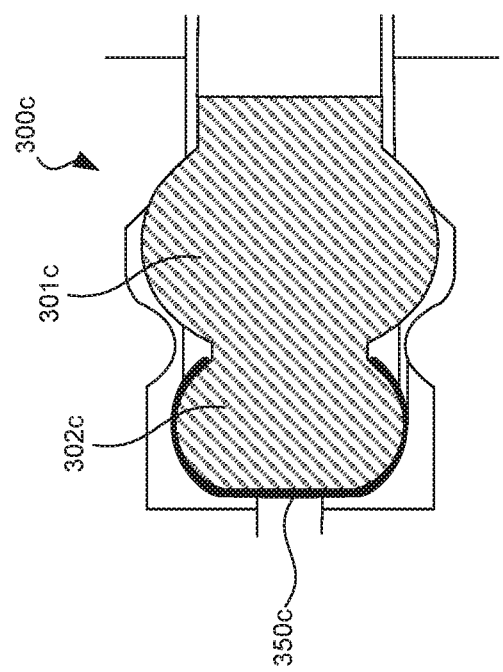

With reference to FIG. 3C, another diaphragm seal 300c suitable for use in the systems described herein is shown, wherein the profile of diaphragm seal 300c at the outer diameter has generally two primary portions: a first round portion 301c located slightly inside the outer diameter of the diaphragm seal 300a and a second round portion 302c at the outer diameter of the diaphragm seal 300c and generally extending in radially outer direction from the first round portion 301c. The first round portion 301c can have a maximum thickness that is generally greater than the maximum thickness of the second round portion 302c.

Figure 3D:
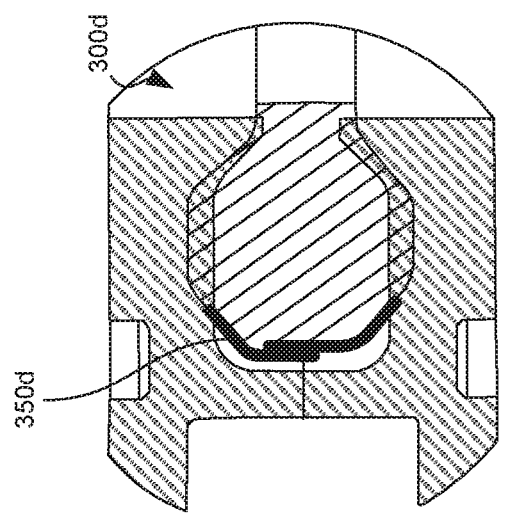

With reference to FIG. 3D, another diaphragm seal 300d is shown, wherein the profile of the diaphragm seal 300d at the outer diameter is generally octagonal with rounded corners.

The material of the diaphragm seal 300 (regardless of the profile shape) can be any material suitable for a diaphragm seal. Generally speaking, the material of the diaphragm seal should be flexible and/or deformable and therefore can be formed of an elastomeric material, such as various rubber materials.

With continuing reference to FIGS. 3A-3D, each diaphragm seal 300a-300d is shown with a high-pressure seal 350a-350d adapted for use with the specific diaphragm profile shown. While each diaphragm seal 300a-d is shown with a specific high-pressure seal 350a-d, it is contemplated that the different high-pressure seal configurations shown can be used with different diaphragm seals than what is shown in FIGS. 3A-3D.

With reference to FIG. 3A, the high-pressure seal 350a has a general E-shape and is dimensioned relative to the diaphragm seal 300a so as to envelope the outer diameter side of the diaphragm seal 300a, and more specifically, the T-shaped portion of the second extension portion 302a. As shown in FIG. 3A, the ends of the high-pressure seal 350a are configured to extend over and past the T-shaped portion of the second extension portion 302a. The E-shaped high-pressure seal 350a can have a generally rounded E-shape as shown in FIG. 3A, or may have a more squared off E-shape.

With reference to FIG. 3B, the high-pressure seal 350b has a generally C-shape. The C-shape may have three straight sections (one axially aligned section and two angled sections at either end of the axial section) as shown in FIG. 3B so that the high-pressure seal 350b does not perfectly conform to the round shape of the diaphragm seal 300b. In some embodiments, the high-pressure seal 350b is dimensioned so that the high-pressure seal 350b does not extend at its ends to the maximum thickness of the diaphragm seal 300b. Instead, the overall height of the high-pressure seal 350b is less than the maximum thickness of the diaphragm seal 300b.

With reference to FIG. 3C, the high-pressure seal 350c may have a generally C-shape. As with the high-pressure seal 350b shown in FIG. 3B, the C-shaped seal 350c may be made up of multiple straight sections so that the C-shaped seal 350c does not perfectly conform to the second round portion 302c of the diaphragm seal 300c. Unlike in FIG. 3B, however, the high-pressure seal 350c may be configured so that the C-shaped high-pressure seal 350c extends over and past the maximum thickness of the second round portion 302c so that the high pressure seal 350c at least partially envelopes the second round portion 302c of the diaphragm seal 300c. In some embodiments, the high-pressure seal 350c is dimensioned so that the ends contact or almost contact the junction of the second round portion 302c and the first round portion 301c of the diaphragm seal 300c.

With reference to FIG. 3D, the high-pressure seal 350d may have a generally C-shape similar to the C-shape of the high-pressure seal 350b, but the high-pressure seal 350d is provided in two parts. Each part of the high-pressure seal 350d has two sections: a vertical section and an angled section. When installed, the vertical sections of the high-pressure seal 350d may overlap. In some embodiments, the two parts of the high-pressure seal 350d are connected to one another, such as through bonding, welding, adhesive, mechanical means or other means, while in other embodiments, the two parts of the high-pressure seal 350d are not connected to each other, and instead merely reside against each other when installed in the pump housing.

The material of the high-pressure seal 350 (regardless of the profile) can be any suitable material for a high-pressure seal. Generally speaking, the material of the high-pressure seal should be resilient. In some embodiments, the high-pressure seal 350 is made from metal, such as steel. Additional material can be incorporated in a metal high pressure seal, such as PTFE.

In some embodiments, the high-pressure seal is partially or wholly coated with an additional material, such as a polymer or an elastomericmaterial.

With reference to FIG. 4, a manner of engaging the high-pressure seal 350 with the diaphragm seal 300 and installing the combined high-pressure seal 350 and diaphragm seal 300 in a pump housing 400 is shown. The pump housing 400 generally includes an upper pump housing portion 401 and a lower pump housing portion 402. When aligned and brought together, the upper pump housing portion 401 and lower pump housing portion 402 mate together to define a central passageway through the pump housing. Both the upper pump housing portion 401 and the lower pump housing portion 402 include a recess configured to receive the upper and lower halves of the combined diaphragm seal 300 and high-pressure seal 350, respectively. When the upper pump housing portion 401 and the lower pump housing portion 402 are brought together around the combined diaphragm seal 300 and high-pressure seal 350, the upper pump housing portion 401 and the lower pump housing portion 402 define a cavity in which the combined diaphragm seal 300 and high-pressure seal 350 reside.

In one manner of installation, the high-pressure seal 350 is first combined with the diaphragm seal 300 (i.e., by placing the high-pressure seal 350 on the outer diameter side of the diaphragm seal 300) before bringing together the upper pump housing portion 401 and the lower pump housing portion 402 to envelope the combined diaphragm seal 300 and high-pressure seal 350.

Figure 5A:
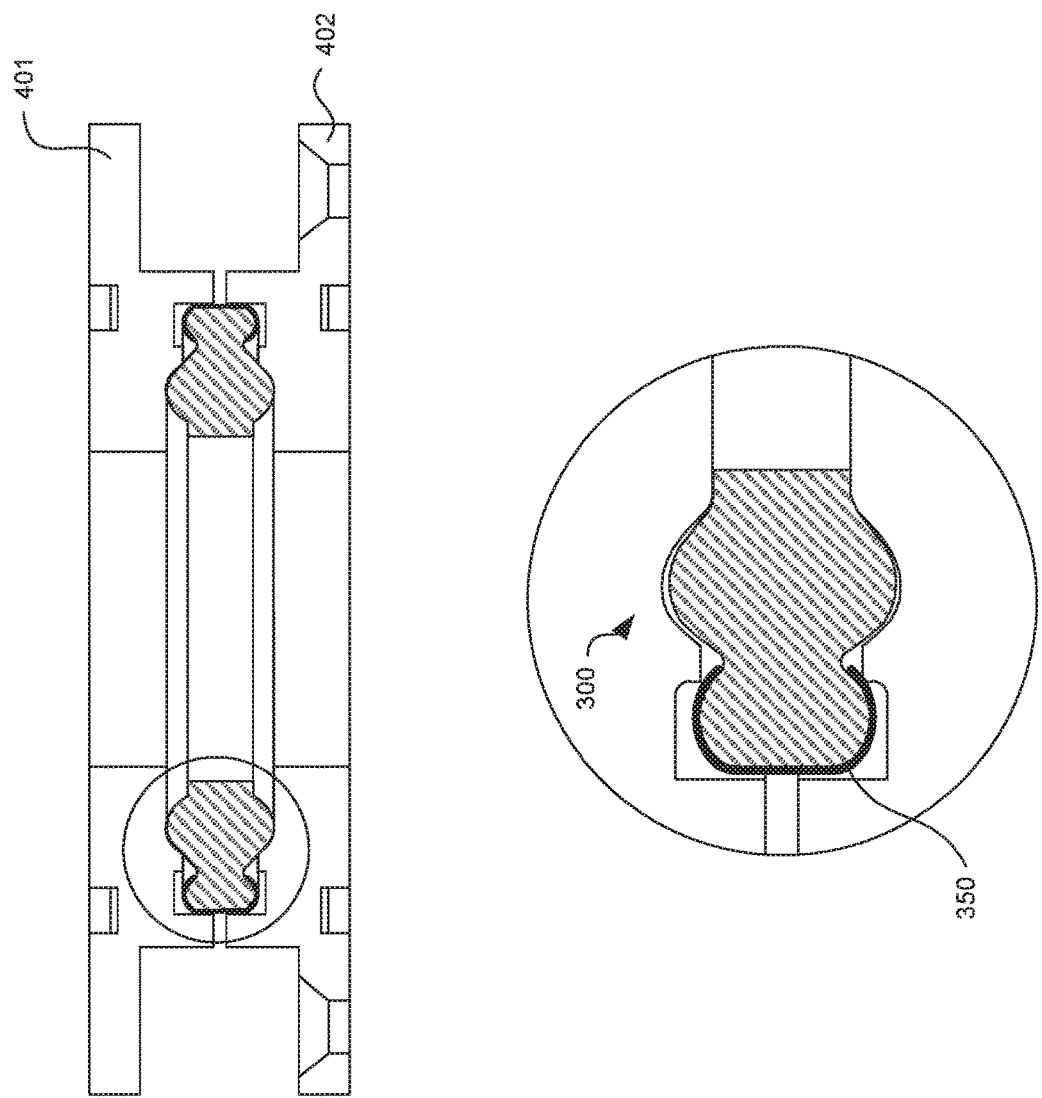
FIGS. 5A-5C are cross-sectional views showing the movement of a diaphragm seal mounted in a high-pressure seal and a pump housing as clamping load is applied to the pump housing according to various embodiments described herein.
Figure 5B:
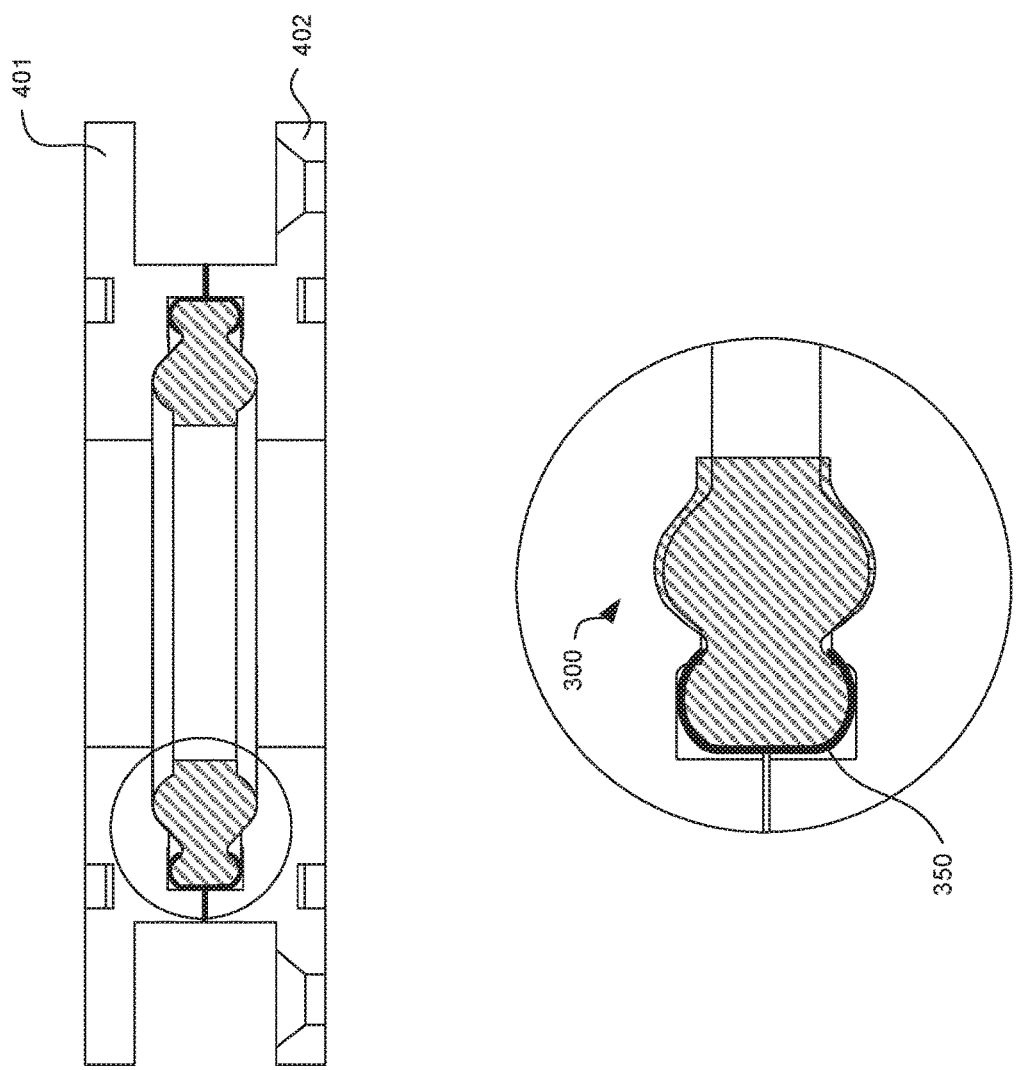
Figure 5C:
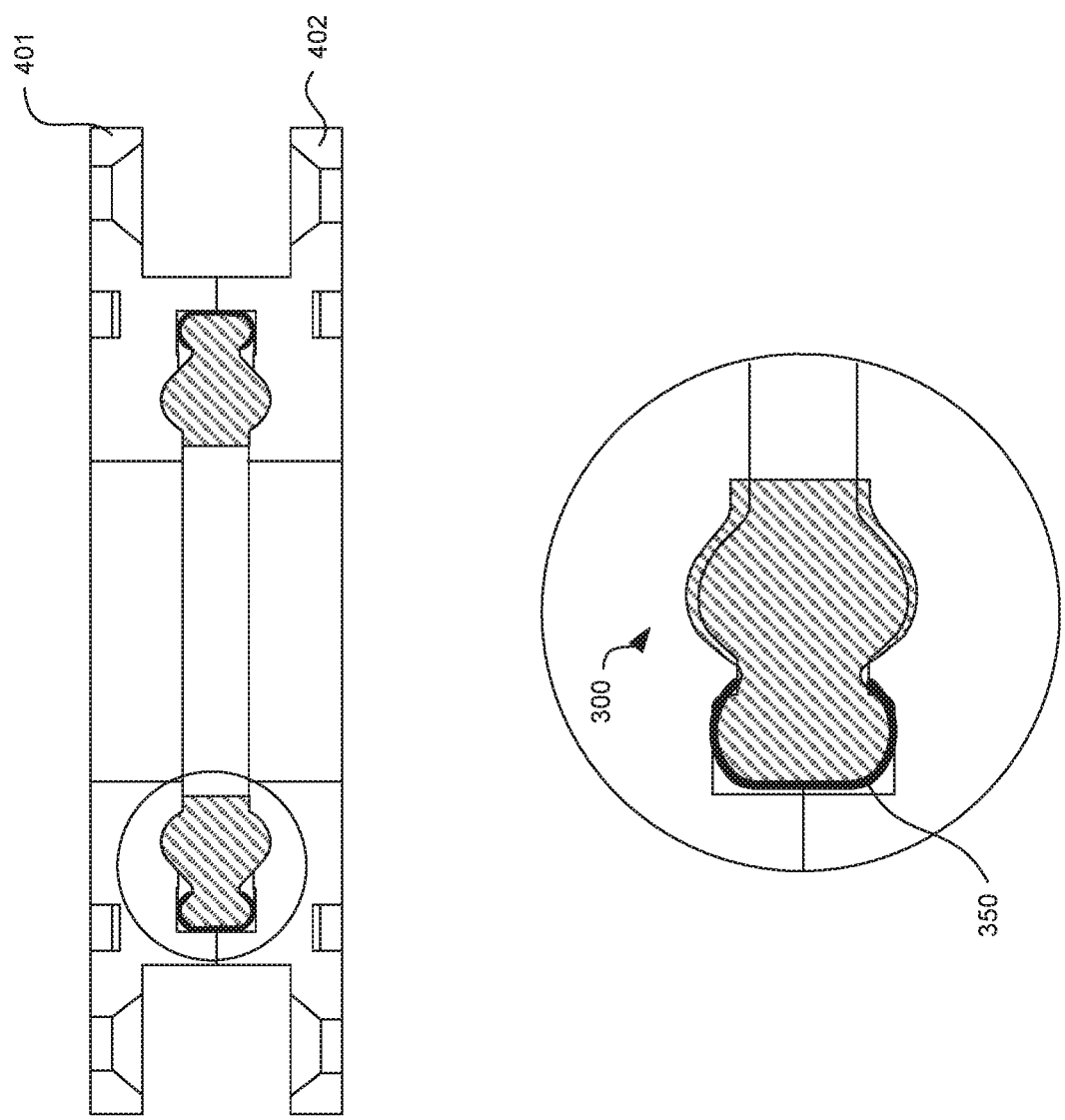

Once the combined diaphragm seal 300 and high-pressure seal 350 is positioned between the upper pump housing portion 401 and the lower pump housing portion 402, the installation method will typically involve a clamping operation wherein the upper pump house portion 401 and the lower pump house portion 402 are brought together through a clamping action to minimize the space between the two portions. With reference to FIGS. 5A-5C, the progressively added clamping force may alter the shape of the diaphragm seal as more load is added. In FIG. 5A, initial clamping force is applied near an inner diameter of the diaphragm seal 300 (shown by vertical arrows). Such force causes the elastomeric diaphragm seal to flex and change shape such that the diaphragm seal comes into contact with the upper and lower pump housing portions 401, 402 at an area near the inner diameter of the system (shown byX's).

In FIG. 5B, continued clamping force exerts additional force in a similar region to where force is exerted upon initial clamping, with force now applied across a larger area near the inner diameter of the diaphragm seal 300. This additional force causes the elastomeric diaphragm seal 300 to continue to flex and change shape and conform more fully to the contours of the recesses in the upper and lower pump housing portions 401 and 402. The diaphragm seal begins to contact the upper and lower pump housing portions in more locations, as shown by the X's in FIG. 5B. In some embodiments similar to those shown in FIGS. 5A-5C where a diaphragm seal 300 has two rounded sections, the continued clamping force causes the first rounded section (inner diameter section) to fully or almost fully conform to the contours of the upper and lower pump housing portions 401, 402, while the second rounded section (outer diameter section) has not yet changed shape to adjust to the shape of the high pressure seal enveloping the second round section. However, as shown by the lighter arrows, the direction of elastomer compression is towards the outer diameter (i.e., second rounded portion enveloped by high pressure seal).

Finally, in FIG. 5C, the clamping force continues such that the diaphragm seal flexes and changes shape in the outer diameter area, such as in the second rounded portion. As mentioned previously, the high-pressure seal may have a shape that does not conform perfectly to the shape of the diaphragm seal when the combined diaphragm seal and high-pressure seal are not yet under pressure. However, when under clamping pressure such as shown in FIG. 5C, the portion of the diaphragm seal enveloped by the high pressure seal will begin to flex and change shape so as to more closely conform to the shape of the high pressure seal and fill any void spaces/gaps that may exist between diaphragm seal and the high pressure seal before they are under pressure.

From the foregoing, it will be appreciated that specific embodiments of the invention have been described herein for purposes of illustration, but that various modifications may be made without deviating from the scope of the invention. Accordingly, the invention is not limited except as by the appended.

Although the technology has been described in language that is specific to certain structures and materials, it is to be understood that the invention defined by the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all numbers or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that between and/or inclusive or the minimum value of 1 or more and ending with a maximum value of 10 or less (e.g., 5.5 to 10, 2.34 to 3.56, and so forth) or any value from 1 to 10 (e.g., 3, 5.8, 9.9994, and so forth).

We claim:

1. A diaphragm seal assembly comprising:
   a diaphragm seal comprising an outer diameter portion and an interior portion, wherein a maximum thickness, in an axial direction, of the outer diameter portion is greater than a maximum thickness, in an axial direction, of the interior portion, wherein the outer diameter portion comprises:
      an outer section having a first thickness in an axial direction;
      an interior section located radially inwardly from the outer section having a second thickness in the axial direction; and
      a throat portion located radially inwardly from the outer section and radially outwardly from the interior section having a throat thickness in the axial direction;
      wherein a maximum thickness of the outer section is less than a maximum thickness of the interior section and wherein the throat thickness has a maximum thickness that is less than the maximum thickness of the outer section and maximum thickness of the interior section; and
   an annular high-pressure seal, wherein the annular high-pressure seal resides against at least an outer diameter side of the outer section of the outer diameter portion of the diaphragm seal.

2. The diaphragm seal assembly of claim 1, wherein the annular high-pressure seal has a C-shape or an E-shape.

3. The diaphragm seal assembly of claim 1, wherein the annular high-pressure seal extends over the maximum thickness of the outer section of the outer diameter portion.

4. The diaphragm seal assembly of claim 1, wherein the shape of the annular high-pressure seal is different from the shape of the outer section of the outer diameter portion.

5. The diaphragm seal assembly of claim 1, wherein the annular high-pressure seal does not extend past the maximum thickness of the outer section of the outer diameter portion.

6. The diaphragm seal assembly of claim 1, wherein the annular high-pressure seal comprises at least three straight sections, with each of the at least three straight sections being oriented at different angles with respect to each other.

7. The diaphragm seal assembly of claim 1, wherein the interior portion of the diaphragm seal includes a passage extending from a first axial side of the diaphragm seal to a second axial side of the diaphragm seal.

8. The diaphragm seal assembly of claim 1, wherein the outer diameter portion has an octagonal shape.

9. The diaphragm seal assembly of claim 1, wherein the outer diameter portion has a circular shape.

10. The diaphragm seal assembly of claim 1, wherein the material of the diaphragm seal is an elastomeric material.

11. The diaphragm seal assembly of claim 1, wherein the material of the annular high-pressure seal is a metal material.

12. A diaphragm seal assembly comprising:
   a diaphragm seal comprising an outer diameter portion and an interior portion, wherein a maximum thickness, in an axial direction, of the outer diameter portion is greater than a maximum thickness, in an axial direction, of the interior portion; and
   an annular high-pressure seal, wherein the annular high-pressure seal resides against at least an outer diameter side of the outer diameter portion of the diaphragm seal, wherein the annular high-pressure seal comprises a first part and a second part separable from the first part.

13. The diaphragm seal assembly of claim 12, wherein at least a portion of the first part overlaps with at least a portion of the second part, and wherein both the first part and the second part reside against the outer diameter side of the outer diameter portion.

14. The diaphragm seal assembly of claim 13, wherein the overlapping portions of the first part and the second part are secured to one another.

15. A housing assembly comprising:
   an upper housing assembly portion, wherein an annular recess is formed in the axial lower side of the upper housing assembly;
   a lower housing assembly portion, wherein an annular recess is formed in the axial upper side of the upper housing assembly and wherein the annular recess of the upper housing assembly portion aligns with the annular recess of the lower housing assembly portion when the upper housing assembly portion is aligned with the lower housing assembly portion;
   a diaphragm seal comprising an outer diameter portion and an interior portion, wherein a maximum thickness, in an axial direction, of the outer diameter portion is greater than a maximum thickness, in an axial direction, of the interior portion, wherein the outer diameter portion comprises:
      an outer section having a first thickness in an axial direction, wherein the first thickness has a maximum thickness;
      an interior section located radially inwardly from the outer section having a second thickness in the axial direction, wherein the second thickness has a maximum thickness; and
      a throat portion located between the outer section and the interior section having a throat thickness in the axial direction;
      wherein the maximum thickness of the outer section is less than the maximum thickness of the interior section and wherein a maximum thickness of the throat portion is less than the maximum thickness of the outer section and the interior section; and
   an annular high-pressure seal, wherein the annular high-pressure seal resides against at least an outer diameter side of the outer diameter portion of the diaphragm seal;
   wherein the diaphragm seal and the annular high-pressure seal are disposed within the recesses of the upper housing portion and the lower housing portion such that the upper housing portion and the lower housing portion substantially encapsulate at least the outer diameter portion of the diaphragm seal and the annular high-pressure seal.

16. The housing assembly of claim 15, wherein the dimensions of the recesses relative to the dimensions of the diaphragm seal and the high-pressure seal are such that the upper housing portion and the lower housing portion compress the diaphragm seal and the high-pressure seal when the upper housing portion and the lower housing portion are joined together.

17. The housing assembly of claim 16, wherein compression of the diaphragm seal and the high-pressure seal by the upper housing portion and the lower housing portion causes the shape of the outer diameter portion of the diaphragm seal to conform to the shape of the high-pressure seal.

18. The housing assembly of claim 15, wherein the high pressure seal forms a radial barrier between the diaphragm seal and the upper and lower housing portion at the location where the axial lower side of the upper housing contacts the axial upper side of the lower housing portion when the upper and lower housing portions are joined together.

19. The housing assembly of claim 15 wherein the annular high-pressure seal comprises a first part and a second part separable from the first part.

20. The housing assembly of claim 19, wherein at least a portion of the first part overlaps with at least a portion of the second part, and wherein both the first part and the second part reside against the outer diameter side of the outer diameter portion.

* * * * *